US012442131B2

(12) United States Patent
Cristobal et al.

(10) Patent No.: US 12,442,131 B2
(45) Date of Patent: Oct. 14, 2025

(54) METHOD FOR TREATING FABRICS

(71) Applicant: SPECIALTY OPERATIONS FRANCE, Lyons (FR)

(72) Inventors: Galder Cristobal, Singapore (SG); Sujandi Zhou, Singapore (SG); Caroline Mabille, Baron (FR); Katerina Karagianni, Paris (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 792 days.

(21) Appl. No.: 17/293,234

(22) PCT Filed: Nov. 13, 2019

(86) PCT No.: PCT/EP2019/081130
§ 371 (c)(1),
(2) Date: May 12, 2021

(87) PCT Pub. No.: WO2020/099463
PCT Pub. Date: May 22, 2020

(65) Prior Publication Data

US 2022/0049416 A1 Feb. 17, 2022

(30) Foreign Application Priority Data

Nov. 14, 2018 (EP) .................................... 18206306

(51) Int. Cl.
*D06M 15/03* (2006.01)
*C11D 1/94* (2006.01)
(Continued)

(52) U.S. Cl.
CPC ............... *D06M 15/03* (2013.01); *C11D 1/94* (2013.01); *C11D 3/0021* (2013.01); *C11D 3/222* (2013.01);
(Continued)

(58) Field of Classification Search
None
See application file for complete search history.

(56) References Cited

U.S. PATENT DOCUMENTS 3,472,840 A 10/1969 Stone et al.
4,031,307 A 6/1977 DeMartino et al.
(Continued)

FOREIGN PATENT DOCUMENTS

WO WO-0130951 A1 * 5/2001 ......... C11D 11/0017
WO 2017100992 A1 6/2017
WO WO-2017102306 A1 * 6/2017 ............... C11D 1/62

OTHER PUBLICATIONS

Jaguar C-162 Product Data Sheet, sold by the company Rhodia—Dec. 2008—PDF accessed online from Glenn Corp on Feb. 14, 2025 at http://glenncorp.com/wp-content/uploads/2013/07/Jaguar-C-162-pds1.pdf (Year: 2008).*

*Primary Examiner* — Katie L. Hammer
(74) *Attorney, Agent, or Firm* — Osha Bergman Watanabe & Burton LLP

(57) ABSTRACT

The invention relates to a method for treating a fabric, notably a method for preventing or recovering degradation of a fabric, by using a cationic polygalactomannan, wherein the cationic polygalactomannan contains non-ionic hydroxyalkyl substituents and has a Brookfield RVT viscosity at 25° C. and 20 rpm greater than 700 mPa·s, at a concentration of 1 wt % in water.

6 Claims, 4 Drawing Sheets

Figure 1:
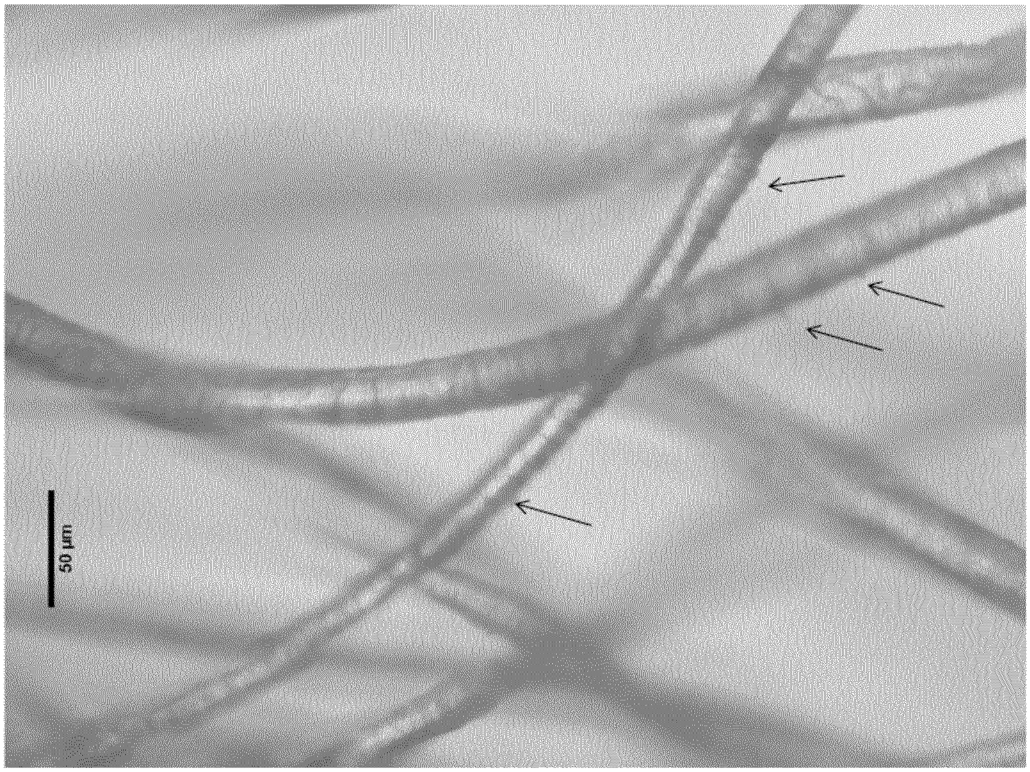

(51) Int. Cl.
*C11D 3/00* (2006.01)
*C11D 3/22* (2006.01)
*D06P 1/48* (2006.01)

(52) U.S. Cl.
CPC .............. *C11D 3/227* (2013.01); *C11D 3/228* (2013.01); *D06P 1/48* (2013.01); *D06M 2200/50* (2013.01)

(56) References Cited

U.S. PATENT DOCUMENTS

| | | | | |
|---|---|---|---|---|
| 4,663,159 | A | 5/1987 | Brode, II et al. | |
| 4,959,464 | A | 9/1990 | Yeh | |
| 5,387,675 | A | 2/1995 | Yeh | |
| 5,473,059 | A | 12/1995 | Yeh | |
| 5,733,854 | A * | 3/1998 | Chowdhary ........... | A61K 8/737 424/70.13 |
| 2004/0067864 | A1 | 4/2004 | Aubay et al. | |
| 2004/0092425 | A1 | 5/2004 | Boutique et al. | |
| 2010/0029929 | A1 | 2/2010 | Luczak et al. | |
| 2011/0123563 | A1 | 5/2011 | Langella et al. | |
| 2013/0210693 | A1 * | 8/2013 | Lambert ................ | C11D 3/227 510/276 |
| 2016/0340615 | A1 | 11/2016 | Lambert et al. | |
| 2017/0369818 | A1 * | 12/2017 | Park ......................... | C11D 1/29 |

* cited by examiner

METHOD FOR TREATING FABRICS

This application is a U.S. national phase entry under 35 U.S.C. § 371 of International Application No. PCT/EP2019/081130, filed on Nov. 13, 2019, which claims priority to European Application No. 18206306.5, filed on Nov. 14, 2018. The entire contents of these applications are explicitly incorporated herein by this reference.

FIELD OF THE INVENTION

The present invention relates to a method for treating a fabric, notably a method for preventing or recovering degradation of a fabric, by using a cationic polygalactomannan containing non-ionic hydroxyalkyl substituents and having a specific viscosity.

BACKGROUND

Washing of fabrics, especially machine washing of fabrics, leads to a physical and chemical degradation of the fabric fibers, and most particularly of cotton and wool fibers. The alkalinity delivered by detergents and also by certain specific compounds, such as oxidizing substances (perborate or percarbonate) and certain enzymes, may be the cause of the chemical degradation of fabric fibers. However, it is generally the combination of the chemical and mechanical actions which leads to degradation of the fibers. The mechanical action is produced during the washing, rinsing, spin-drying or tumble-drying, when the latter takes place in a tumble dryer. This degradation of the fibers leads to the formation of fibrils at surface of the fabrics, and this may also cause colored fabrics to lose their radiance. This degradation also induces a decrease in the strength of the fabrics which, at the extreme, may lead to tearing. Cleaning in a washing machine, which normally includes a spin-drying operation, also leads to creased fabrics, which is accentuated during the tumble-drying stage, in particular by the formation of inter-fiber hydrogen bonds. It is thus necessary to iron the fabrics in order to make them look presentable.

There is a need to provide a method for treating fabrics which causes minimal degradation of the fabrics. There is a need to provide a composition for treating fabrics, such as for washing fabrics, which causes minimal degradation of the fabrics. There is a need to provide an agent for preventing or recovering degradation of the fabrics.

US patent publication no. 2004/0067864 discloses use of an amphoteric polysaccharide in compositions for caring fabrics. The composition can prevent degradation of fabrics and protect the colors of fabrics.

SUMMARY OF THE INVENTION

The aim of the present invention is therefore to provide an ingredient which is useful for preventing or recovering degradation of fabrics during treatment of fabrics.

It is also an object of the present invention to provide an ingredient which is additionally effective in recovering fabrics which already have degradation.

It is also an object of the present invention to provide an ingredient which is additionally effective in protecting the colors of fabrics.

It is also an object of the present invention to provide a composition for treating fabrics which would cause minimal degradation of the fabrics.

The Applicant has now discovered unexpectedly that a specific cationic polygalactomannan containing non-ionic hydroxyalkyl substituents and having a specific viscosity is useful as an agent for preventing or reducing degradation of fabrics. In particular, the cationic polygalactomannan could recover fibrils at surface of the fabric fibers and could thus protect strength of the fabrics. The cationic polygalactomannan could also protect colors of the fabrics as degradation of the fabrics, either chemical or physical degradation, would lead to fading or change of colors, such as fading, yellowing, and greying. The cationic polygalactomannan can be advantageously included in compositions used for treating fabrics, such as detergent compositions.

The subject of the invention is thus a method for treating a fabric, notably a method for preventing or recovering degradation of a fabric, comprising the step of contacting the fabric with a cationic polygalactomannan, wherein the cationic polygalactomannan contains non-ionic hydroxyalkyl substituents and has a Brookfield RVT viscosity at 25° C. and 20 rpm greater than 700 mPa·s, at a concentration of 1 wt % in water, for instance comprised between 700 and 1,200 mPa·s. The fabric may be contacted with the cationic polygalactomannan during a treatment of the fabric, such as washing or conditioning of the fabric.

In particular, the present invention relates to a method for recovering degradation of a fabric, comprising the step of contacting a fabric having degradation with a cationic polygalactomannan, wherein said cationic polygalactomannan contains non-ionic hydroxyalkyl substituents and has a Brookfield RVT viscosity at 25° C. and 20 rpm greater than 700 mPa·s, at a concentration of 1 wt % in water, for instance comprised between 700 and 1,200 mPa·s.

The present invention also relates to use of a cationic polygalactomannan for treating a fabric, notably for preventing or recovering degradation of a fabric, wherein the cationic polygalactomannan contains non-ionic hydroxyalkyl substituents and has a Brookfield RVT viscosity at 25° C. and 20 rpm greater than 700 mPa·s, at a concentration of 1 wt % in water, for instance comprised between 700 and 1,200 mPa·s.

The present invention also relates to use of a cationic polygalactomannan for recovering degradation of a fabric having degradation, wherein said polygalactomannan contains non-ionic hydroxyalkyl substituents and has a Brookfield RVT viscosity at 25° C. and 20 rpm greater than 700 mPa·s, at a concentration of 1 wt % in water, for instance comprised between 700 and 1,200 mPa·s.

According to the present invention, the fabric may be contacted with a composition, notably an aqueous solution, containing the cationic polygalactomannan described herein.

By using the specific cationic polygalactomannans containing non-ionic hydroxyalkyl substituents and having a specific viscosity according to the invention, fabric fiber surface may advantageously look smoother, and fibrils may be recovered and/or prevented. These benefits can for instance be demonstrated through microscopy, as shown in the Examples.

Advantageously, no residual powder arises from the use of the specific cationic polygalactomannans containing non-ionic hydroxyalkyl substituents and having the specific viscosity according to the invention.

Advantageously, the specific cationic polygalactomannan containing non-ionic hydroxyalkyl substituents and having the specific viscosity according to the invention may also provide durable color protection, meaning in particular that colored fabrics may resist multiple washing cycles.

According to another specific aspect, the present invention is directed to the use of the cationic polygalactomannan as defined herein for color protection of fabrics.

The present invention is also directed to a method for protecting the colors of fabrics, for example during a treatment of the fabrics, comprising the step of contacting the fabrics with a cationic polygalactomannan containing non-ionic hydroxyalkyl substituents and having a Brookfield RVT viscosity at 25° C. and 20 rpm greater than 700 mPa·s, at a concentration of 1 wt % in water, for instance comprised between 700 and 1,200 mPa·s.

FIGURES

FIG. 1 depicted the fabrics treated with the DI under the microscopy, indicating damage to the fabrics.

FIG. 2 depicted the fabrics treated with Cationic Polygalactomannan 1 under the microscopy, indicated reduced damage to the fabrics.

FIG. 3 depicted the comparison between the fabrics treated with Cationic Polygalactomannan 1 or not.

As used herein, the term "fabric" includes woven goods and also nonwoven or felted, porous or perforated goods, and similar goods having flexible or pliable characteristics which are suitable for use in clothing, headgear, footwear, and similar uses, regardless of whether the material of the goods is in one layer or multiple layers and regardless of whether the goods are natural, synthetic, or blended, such as cotton, wool, silk.

As used herein, the term "treating fabric" or "treatment of fabrics" includes and is not limited to: washing and cleaning of fabrics, pretreatment of fabrics, conditioning of fabrics such as delicate fabric washing, and post-treatment such as softening and ironing.

As used herein, the term "degradation of fabrics" refers to any physical or chemical degradation phenomena of fabrics, which may be in form of: formation of fibrils, fading/change of colors, tearing, reduced fabric tensile strength, increased crispness, loss in smoothness.

Polygalactomannans

Galactomannans are polysaccharides consisting mainly of the monosaccharides mannose and galactose. The mannose-elements form a chain consisting of many hundreds of (1,4)-ß-D-mannopyranosyl-residues, with 1,6 linked-D-galactopyranosyl-residues at varying distances, dependent on the plant of origin. Naturally occurring galactomannans are available from numerous sources, including guar gum, guar splits, locust bean gum, flame tree gum and cassia gum.

Additionally, galactomannans may also be obtained by classical synthetic routes or may be obtained by chemical modification of naturally occurring galactomannans.

Guar gum refers to the mucilage found in the seed of the leguminous plant *Cyamopsis tetragonolobus*. The water soluble fraction (85%) is called "guaran," which consists of linear chains of (1,4)-β-D mannopyranosyl units—with α-D-galactopyranosyl units attached by (1,6) linkages. The ratio of D-galactose to D-mannose in guaran is about 1:2.

Guar seeds are composed of a pair of tough, non-brittle endosperm sections, hereafter referred to as "guar splits," between which is sandwiched the brittle embryo (germ). After dehulling, the seeds are split, the germ (43-47% of the seed) is removed by screening, and the splits are ground. The ground splits are reported to contain about 78-82 wt % galactomannan polysaccharide and minor amounts of some proteinaceous material, inorganic non-surfactant salts, water-insoluble gum, and cell membranes, as well as some residual seedcoat and embryo.

Locust bean gum or carob bean gum is the refined endosperm of the seed of the carob tree, *Ceratonia siliqua*. The ratio of galactose to mannose for this type of gum is about 1:4. Locust bean gum is commercially available.

As mentioned previously, the polygalactomannan used in the invention is a cationic polygalactomannan, that is to say a polygalactomannan that is substituted at one or more sites of the polygalactomannan with a substituent group that is a cationic substituent group.

The cationic polygalactomannan used in the invention also contains non-ionic hydroxyalkyl substituents. In other words, the cationic polygalactomannan is further substituted at one or more sites of the polygalactomannan with a substituent group that is a non-ionic hydroxyalkyl substituent group. The hydroxyalkyl substituent group may be linear or branched, and may contain from 1 to 10 carbon atoms, especially from 1 to 5 carbon atoms, for instance from 2 to 4 carbon atoms. Mention may be made for instance of hydroxyethyl groups, hydroxypropyl groups and hydroxybutyl groups.

According to any one of the invention embodiments, the polygalactomannan preferably contains hydroxypropyl groups.

According to any one of the invention embodiments, the galactomannan is preferably a guar. It may be for instance a cationic guar containing hydroxypropyl substituents, preferably a hydroxypropyl guar hydroxypropyltrimonium chloride.

The amount of cationic or of non-ionic hydroxyalkyl substituents in the polygalactomannan may be characterized respectively by the degree of substitution or by the molar substitution of the polygalactomannan.

As used herein, the terminology "degree of substitution" in reference to a given type of derivatizing group and a given polygalactomannan means the number of the average number of such derivatizing groups attached to each monomeric unit of the polygalactomannan. In one embodiment, the derivatized polygalactomannan exhibits a total degree of substitution ("$DS_T$") of from about 0.001 to about 3.0, wherein:

- $DS_T$ is the sum of the DS for cationic substituent groups ("$DS_{cationic}$") and the DS for nonionic substituent groups ("$DS_{nonionic}$"),
- $DS_{cationic}$ (or denoted as $DS_{cat}$) is from 0 to about 3, more typically from about 0.001 to about 2.0, and even more typically from about 0.001 to about 1.0,
- $DS_{nonionic}$ is from 0 to 3.0, more typically from about 0.001 to about 2.5, and even more typically from about 0.001 to about 1.0, and
- $DS_{cationic}$ and $DS_{nonionic}$, may be measured for instance by $^1$H-NMR.

As used herein, the term "molar substitution" or "ms" refers to the number of moles of derivatizing groups per moles of monosaccharide units of the guar. The molar substitution can be determined by the Zeisel-GC method. The molar substitution utilized by the present invention is typically in the range of from about 0.001 to about 3.

Processes for making polygalactomannans derivatives are known. In particular, processes for making derivatives of guar gum splits are generally known. Typically, guar splits are reacted with one or more derivatizing agents under appropriate reaction conditions to produce a guar polysaccharide having the desired substituent groups. Suitable derivatizing reagents are commercially available and typically contain a reactive functional group, such as an epoxy group, a chlorohydrin group, or an ethylenically unsaturated group, and at least one other substituent group, such as a cationic, nonionic or anionic substituent group, or a precursor of such a substituent group per molecule, wherein substituent group may be linked to the reactive functional group of the derivatizing agent by bivalent linking group, such as an alkylene or oxyalkylene group. Suitable cationic substituent groups include primary, secondary, or tertiary amino groups or quaternary ammonium, sulfonium, or phosphinium groups. Suitable nonionic substituent groups include hydroxyalkyl groups, such as hydroxypropyl groups. Suitable anionic groups include carboxyalkyl groups, such as carboxymethyl groups. The cationic, nonionic and/or anionic substituent groups may be introduced to the polysaccharide chains via a series of reactions or by simultaneous reactions with the respective appropriate derivatizing agents.

The polygalactomannans derivative, for instance the guar derivative, may be treated with a crosslinking agent, such as borax (sodium tetra borate) is commonly used as a processing aid in the reaction step of the water-splits process to partially crosslink the surface of the guar splits and thereby reduces the amount of water absorbed by the guar splits during processing. Other crosslinkers, such as glyoxal or titanate compounds, are known.

After the preparation, the polygalactomannan can be treated with several known reagents, for example: caustic; acids; biochemical oxidants, such as galactose oxidase; chemical oxidants, such as hydrogen peroxide; and enzymatic reagents; or by physical methods using high speed agitation machines; thermal methods; and combinations of these reagents and methods. Reagents such as sodium metabisulfite or inorganic salts of bisulfite may also be optionally included.

The treatments described here above can be also performed on the polygalactomannan before the derivatization process.

In a preferred embodiment, the polygalactomannan is a depolymerized polygalactomannan, which has been depolymerized by using chemicals, such as hydrogen peroxide, or cellulase enzymes.

According to any one of the invention embodiments, the polygalactomannan preferably has a cationic degree of substitution $DS_{cat}$ ranging from about 0.001 to about 3.

According to any one of the invention embodiments, the polygalactomannan may have a hydroxyalkyl molar substitution ranging from about 0.001 to about 3.

The weight average molecular weight of the polygalactomannan used in the invention may be measured for instance by SEC-MALS or by using gel permeation chromatography.

According to any one of the invention embodiments, the polygalactomannan used in the invention may be a cationic guar derivative having a cationic degree of substitution $DS_{cat}$ comprised between about 0.1 and about 1, a hydroxyalkyl molar substitution comprised between about 0.1 and about 1 and a weight average molecular weight comprised between about 500,000 g/mol and about 4,000,000 g/mol.

As an alternative to polygalactomannans, mention may be made of other polysaccharide polymers including, for example, chitosan, pectin, alginate, hyaluronic acid, agar, xanthan, dextrin, starch, cellulose, amylose, amylopectin, alternan, gellan, levan, mutan, dextran, pullulan, fructan, gum arabic, carrageenan, glycogen, glycosaminoglycans, murein, xyloglucans (such as tamarind gum and tamarind gum derivatives such as hydroxypropyl tamarind gum) and bacterial capsular polysaccharides.

Viscosity

It has been found unexpectedly that cationic polygalactomannan containing non-ionic hydroxyalkyl substituents as described previously, and having a specific viscosity, make it possible to prevent or reduce degradation of fabrics.

Viscosity of the cationic polygalactomannan containing non-ionic hydroxyalkyl substituents is the viscosity in mPa·s measured using a Brookfield RVT viscosimeter using spindle 2 at 20 rpm in a water solution containing the cationic polygalactomannan containing non-ionic hydroxyalkyl substituents at a concentration of 1 wt %.

Rheological measurements may be performed for instance according to the following procedure:

- weigh out 396 g of demineralised ultrapure water in a 600 ml beaker;
- weigh out 4 g of a cationic polygalactomannan containing non-ionic hydroxyalkyl substituents of the invention and add it into the 600 ml beaker containing demineralised ultrapure water, under stirring;
- keep stirring until a stable pH value is achieved and adjust pH to 5+/−0.1 with acetic acid;
- measure viscosity of the resulting solution using a Brookfield RVT viscosimeter using spindle 2 at 20 rpm, after equilibration at 25° C. for 1 hour.

According to any one of the invention embodiments, the cationic polygalactomannan preferably has a Brookfield RVT viscosity at 25° C. and 20 rpm comprised between 700 and 950 mPa·s, at a concentration of 1 wt % in water.

According to any one of the invention embodiments, the cationic polygalactomannan preferably has a Brookfield RVT viscosity at 25° C. and 20 rpm comprised between 750 and 950 mPa·s, at a concentration of 1 wt % in water.

According to any one of the invention embodiments, the cationic polygalactomannan preferably has a Brookfield RVT viscosity at 25° C. and 20 rpm comprised between 750 and 900 mPa·s, at a concentration of 1 wt % in water.

According to any one of the invention embodiments, the cationic polygalactomannan preferably has a Brookfield RVT viscosity at 25° C. and 20 rpm comprised between 750 and 850 mPa·s, at a concentration of 1 wt % in water.

A cationic polygalactomannan containing non-ionic hydroxyalkyl substituents and having a viscosity in accordance with the invention can be prepared by any suitable process known by the one skilled in the art. Methods for the preparation of polygalactomannan derivatives are disclosed for instance in U.S. Pat. Nos. 4,663,159; 5,473,059; 5,387,675; 3,472,840; 4,031,307; 4,959,464 and US 2010/0029929, all of which are incorporated herein by reference.

In another aspect, the present invention also relates methods or uses for preventing or recovering degradation of fabrics comprising the step of contacting the fabrics with a composition, notably an aqueous solution, comprising at least one cationic polygalactomannan containing non-ionic hydroxyalkyl substituents and having a specific viscosity as defined previously.

In another aspect, the present invention also relates methods or uses for preventing or recovering degradation of fabrics, comprising the step of contacting the fabrics having degradation with a composition, notably an aqueous solution, comprising at least one cationic polygalactomannan containing non-ionic hydroxyalkyl substituents and having a specific viscosity as defined previously.

In another aspect, the present invention also relates methods or uses for protecting colors of fabrics, comprising the step of contacting the fabrics with a composition comprising at least one cationic polygalactomannan containing non-ionic hydroxyalkyl substituents and having a specific viscosity as defined previously.

The cationic polygalactomannan according to the invention may be provided in a concentrated liquid composition, notably a concentrated liquid detergent composition. Such concentrated composition may be diluted and brought into contact with the fabrics.

The concentrated composition preferably contains from 0.01 to 5 wt % of a cationic polygalactomannan containing non-ionic hydroxyalkyl substituents and having a specific viscosity according to the invention, relative to the total weight of the composition, for instance from 0.05 to 3 wt %, for instance from 0.1 to 1 wt %.

The expression “detergent composition” is used to mean a composition comprising at least a substance or material intended to assist cleaning or having cleaning properties.

According to every one of the invention embodiments, the composition preferably has a pH value of from 6 to 9, such as from 7 to 9.

In one embodiment, the composition, notably the detergent composition, comprises, as the sole agent for preventing or recovering the degradation of fabrics, a cationic polygalactomannan containing non-ionic hydroxyalkyl substituents and having a specific viscosity as defined previously, and contains no other ingredients for that purpose.

Advantageously the cationic polygalactomannan containing non-ionic hydroxyalkyl substituents and having a specific viscosity according to the invention may be combined with a wide range of other fabric benefit agents, including:

Anionic Surfactants

Non-limiting examples of anionic surfactants include sulfates and sulfonates, in particular, linear alkylbenzene-sulfonat.es (LAS), isomers of LAS, branched alkylbenzene-sulfonat.es (BABS), phenylalkanesulfonat.es, alpha-olefin-sulfonates (AOS), olefin sulfonates, alkene sulfonates, alkane-2,3-diylbis(sulfates), hydroxyalkanesulfonat.es and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or salt of fatty acids (soap), and combinations thereof.

The anionic surfactant may include alkyl ether sulphates, soaps, fatty acid ester sulphonates, alkylamide sulfates, alkyl benzene sulphonates, sulphosuccinate esters, primary alkyl sulphates, olefin sulphonates, paraffin sulphonates and organic phosphate. Preferred anionic surfactants are the alkali and alkaline earth metal salts of fatty acid carboxylates, fatty alcohol sulphates, preferably primary alkyl sulfates, more preferably they are ethoxylated, for example alkyl ether sulphates; alkylbenzene sulphonates, alkyl ester fatty acid sulphonates, especially methyl ester fatty acid sulphonates and mixtures thereof.

Notably, the anionic surfactants may be:

alkyl ester sulfonates of formula R—CH($SO_3M$)—COOR', in which R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal (sodium, potassium or lithium) cation, a substituted or unsubstituted ammonium (methyl-, dimethyl-, trimethyl- or tetramethylammonium, dimethylpiperidinium, etc.) or an alkanolamine derivative (monoethanolamine, diethanolamine, triethanolamine, etc.). Mention may be made most particularly of methyl ester sulfonates in which the radical R is $C_{14}$-$C_{16}$;

alkyl sulfates of formula $ROSO_3M$, in which R represents a $C_5$-$C_{24}$ and preferably $C_{10}$-$C_{18}$ alkyl or hydroxyalkyl radical, M representing a hydrogen atom or a cation of the same definition as above, and also the ethoxylenated (EO) and/or propoxylenated (PO) derivatives thereof, containing on average from 0.5 to 30 and preferably from 0.5 to 10 EO and/or PO units;

alkylamide sulfates of formula $RCONHR'OSO_3M$ in which R represents a $C_2$-$C_{22}$ and preferably $C_6$-$C_{20}$ alkyl radical, R' represents a $C_2$-$C_3$ alkyl radical, M representing a hydrogen atom or a cation of the same definition as above, and also the ethoxylenated (EO) and/or propoxylenated (PO) derivatives thereof, containing on average from 0.5 to 60 EO and/or PO units3 saturated or unsaturated $C_8$-$C_{24}$ and preferably $C_{14}$-$C_{20}$ fatty acid salts, $C_9$-$C_{20}$ alkylbenzenesulfonates, primary or secondary $C_8$-$C_{22}$ alkylsulfonates, alkylglyceryl sulfonates, sulfonated polycarboxylic acids, paraffin sulfonates, N-acyl N-alkyltaurates, alkyl phosphates, isethionates, alkyl succinamates, alkyl sulfosuccinates, sulfosuccinate monoesters or diesters, N-acyl sarcosinates, alkylglycoside sulfates, polyethoxycarboxylates; the cation being an alkali metal (sodium, potassium or lithium), a substituted or unsubstituted ammonium residue (methyl-, dimethyl-, trimethyl- or tetramethylammonium, dimethylpiperidinium, etc.) or an alkanolamine derivative (monoethanolamine, diethanolamine, triethanolamine, etc.);

Nonionic Surfactants

- polyoxyalkylenated (polyoxyethylenated, polyoxy-propylenated or polyoxybutylenated) alkylphenols in which the alkyl substituent is $C_6$-$C_{12}$ and containing from 5 to 25 oxyalkylene units; examples which may be mentioned are the products Triton X-45, X-114, X-100 or X-102 sold by Rohm & Haas Co.;
- glucosamide, glucamide or glycerolamide;
- polyoxyalkylenated $C_8$-$C_{22}$ aliphatic alcohols containing from 1 to 25 oxyalkylene (oxyethylene or oxypropylene) units; examples which may be mentioned are the products Tergitol 15-S-9 and Tergitol 24-L-6 NMW sold by Union Carbide Corp., Neodol 45-9, Neodol 23-65, Neodol 45-7 and Neodol 45-4 sold by Shell Chemical Co., and Kyro EOB sold by The Procter & Gamble Co.;
- products resulting from the condensation of ethylene oxide or the-compound resulting from the condensation of propylene oxide with propylene glycol, such as the Pluronic products sold by BASF;
- products resulting from the condensation of ethylene oxide or the compound resulting from the condensation of propylene oxide with ethylenediamine, such as the Tetronic products sold by BASF;
- amine oxides such as $C_{10}$-$C_{18}$ alkyl dimethylamine oxides and $C_8$-$C_{22}$ alkoxy ethyl dihydroxyethylamine oxides;
- alkylpolyglycosides;
- $C_8$-$C_{20}$ fatty acid amides;
- ethoxylated fatty acids;
- ethoxylated fatty amides;
- ethoxylated amines.

Amphoteric and Zwitterionic Surfactants

- betaines or amidobetaines, such as alkyldimethylbetaines, alkylamidopropyldimethylbetaines;
- sulfobetaines or amidosulfobetaines, such as alkyltrimethylsulfobetaines, and the products of condensation of fatty acids and of protein hydrolysates;
- alkyl amphoacetates or alkyl amphodiacetates in which the alkyl group contains from 6 to 20 carbon atoms.

In one aspect, the present invention relates to a light duty detergent composition or a detergent composition suitable for treating delicate fabrics. Incorporation of the cationic polygalactomannan in such composition renders it causing minimal degradation of fabrics.

Notably, the invention relates to a liquid detergent composition, comprising:

(a) from 0.01 to 5 wt % of a cationic polygalactomannan containing non-ionic hydroxyalkyl substituents and having a Brookfield RVT viscosity at 25° C. and 20 rpm greater than 700 mPa·s, at a concentration of 1 wt % in water, for instance comprised between 700 and 1,200 mPa·s; the amount is for instance from 0.05 to 3 wt %, for instance from 0.1 to 1 wt %;

(b) from 0.1 to 20 wt % of an anionic surfactant; the amount is for instance from 0.5 to 20 wt %, for instance from 0.5 to 10 wt %, for instance from 0.5 to 5 wt %, for instance from 1 to 3 wt %;

(c) from 0.01 to 20 wt % of a non-ionic surfactant or an amphoteric surfactant;

the amount is for instance from 0.05 to 10 wt %, for instance from 0.05 to 5 wt %, for instance from 0.1 to 3 wt %; and (d) water;

weight percentages are based on total weight of the composition.

In a preferred embodiment, the liquid detergent composition comprises:

(a) from 0.01 to 5 wt % of a cationic polygalactomannan containing non-ionic hydroxyalkyl substituents and having a Brookfield RVT viscosity at 25° C. and 20 rpm greater than 700 mPa·s, at a concentration of 1 wt % in water, for instance comprised between 700 and 1,200 mPa·s;

(b) from 0.5 to 5 wt % of an anionic surfactant, for instance from 1 to 3 wt %;

(c) from 0.05 to 10 wt % of a non-ionic surfactant or an amphoteric surfactant, for instance from 0.05 to 5 wt %; and (d) water;

weight percentages are based on total weight of the composition.

Said anionic surfactant and non-ionic surfactant can be selected from those described above.

The present invention further relates to use of said liquid detergent composition for preventing or recovering degradation of a fabric.

The present invention further relates to use of said liquid detergent composition for protecting colors of a fabric.

According to the invention, detergent adjuvants ("builders") for improving the surfactant properties may be used in amounts corresponding to about 5-50 wt % and preferably to about 5-30 wt % referring to total weight of the liquid composition or to about 10-80 wt % and preferably 15-50 wt % for the solid composition, these detergent adjuvants being such as:

Mineral Detergent Adjuvants

- polyphosphates (tripolyphosphates, pyrophosphates, orthophosphates or hexametaphosphates) of alkali metals, of ammonium or of alkanolamines;
- tetraborates or borate precursors;
- silicates, in particular those with an $SiO_2/Na_2O$ ratio from about 1.6/1 to 3.2/1;
- alkali metal or alkaline-earth metal carbonates (bicarbonates, sesquicarbonates);
- cogranulates of alkali metal silicate hydrates and of alkali metal (sodium or potassium) carbonates that are rich in silicon atoms in Q2 or Q3 form;
- crystalline or amorphous aluminosilicates of alkali metals (sodium or potassium) or of ammonium, such as zeolites A, P, X, etc.; zeolite A with a particle size of about 0.1-10 micrometers is preferred.

Organic Detergent Adjuvants

- water-soluble polyphosphonates (ethane 1-hydroxy-1,1-diphosphonates-, methylenediphosphonate salts, etc.);
- water-soluble salts of carboxylic polymers or copolymers or water-soluble salts thereof, such as:
- polycarboxylate ethers (oxydisuccinic acid and its salts, monosuccinic acid tartrate and its salts, disuccinic acid tartrate and its salts);
- hydroxypolycarboxylate ethers;
- citric acid and its salts, mellitic acid and succinic acid and their salts;
- polyacetic acid salts (ethylenediaminetetraacetates, nitrilotriacetates, N-(2-hydroxyethyl)nitrilodiacetates);
- $C_5$-$C_{20}$ alkyl succinic acids and their salts (2-dodecenylsuccinates, lauryl succinates);
- carboxylic polyacetal esters;
- polyaspartic acid and polyglutamic acid and their salts;
- polyimides derived from the polycondensation of aspartic acid and/or of glutamic acid;
- polycarboxymethyl derivatives of glutamic acid or of other amino acids.

Bleaching Agents

The composition may also comprise at least one oxygen-releasing bleaching agent comprising a percompound, preferably a persalt. Said bleaching agent may be present in an amount corresponding to about 1% to 30% and preferably from 4% to 20% by weight relative to the composition. As examples of percompounds which may be used as bleaching agents, mention should be made in particular of perborates such as sodium perborate monohydrate or tetrahydrate; peroxygenated compounds such as sodium carbonate peroxyhydrate, pyrophosphate peroxyhydrate, urea peroxyhydrate, sodium peroxide and sodium persulfate. The preferred bleaching agents are sodium perborate monohydrate or tetrahydrate and/or sodium carbonate peroxyhydrate. Said agents are generally combined with a bleaching activator which generates, in situ in the washing medium, a peroxycarboxylic acid in an amount corresponding to about 0.1% to 12% and preferably from 0.5% to 8% by weight relative to the composition. Among these activators, mention may be made of tetraacetylethylenediamine, tetraacetyl-methylenediamine, tetraacetylglycoluryl, sodium p-acetoxybenzenesulfonate, pentaacetylglucose and octaacetyllactose. Mention may also be made of non-oxygenated bleaching agents, which act by photoactivation in the presence of oxygen, these being agents such as sulfonated aluminum and/or zinc phthalocyanins.

Soil-Release Agents

These may be used in amounts of about 0.01-10 wt %, preferably about 0.1-5 wt % and more preferably about 0.2-3 wt %. Mention may be made more particularly of agents such as:

- polyvinyl alcohols;
- polyester copolymers based on ethylene terephthalate and/or propylene terephthalate and polyoxyethylene terephthalate units, with an ethylene terephthalate and/or propylene terephthalate (number of units)/polyoxyethylene terephthalate (number of units) molar ratio from about 1/10 to 10/1 and preferably from about 1/1 to 9/1, the polyoxyethylene terephthalates containing polyoxyethylene units with a molecular weight from about 300 to 5 000 and preferably from about 600 to 5 000;
- sulfonated polyester oligomers obtained by sulfonation of an oligomer derived from ethoxylated allylic alcohol, from dimethyl terephthalate and from 1,2-propylene diol, containing from 1 to 4 sulfonated groups;
- polyester copolymers based on propylene terephthalate and polyoxyethylene terephthalate units and ending with ethyl or methyl units or polyester oligomers ending with alkylpolyethoxy groups or sulfopolyethoxy or sulfoaroyl anionic groups;
- sulfonated polyester copolymers derived from terephthalic, isophthalic and sulfoisophthalic acid, anhydride or diester and from a diol.

Enzymes

The enzyme is preferably selected from the group constituted by: hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. Preferably, the enzymes are proteases, amylases and lipases.

The most commonly used enzymes are proteases (break down protein), amylases (break down starch—a type of carbohydrate) and lipases (break down fats).

Preferred enzymes could include a protease. Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from e.g. family M4 or other metalloprotease such as those from M5, M7 or M8 families.

Suitable proteases include metalloproteases and serine proteases, including neutral or alkaline microbial serine proteases, such as subtilisins (EC 3.4.21.62). In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

- subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii;*
- rypsin-type or chymotrypsin-type proteases, such as trypsin (e.g., of porcine or bovine origin), including Fusarium protease and chymotrypsin proteases derived from Cellumonas;
- metalloproteases, including those derived from *Bacillus amyloliquefaciens;*
- subtilisin proteases derived from the *Bacillus* sp TY-145, NCIMB 40339.

Non-Ionic Polysaccharides

In some embodiments, the composition further comprises a non-ionic polysaccharide. The nonionic polysaccharide can be a modified nonionic polysaccharide or a non-modified nonionic polysaccharide. The modified nonionic polysaccharide may comprise hydroxyalkylations. In the context of the present application, the degree of hydroxyalkylation (molar substitution or ms) of the modified nonionic polysaccharides means the number of alkylene oxide molecules consumed by the number of free hydroxyl functions present on the polysaccharides. In one embodiment, the MS of the modified nonionic polysaccharide is in the range of 0 to 3. In another embodiment, the MS of the modified nonionic polysaccharide is in the range of 0.1 to 3. In still another embodiment, the MS of the modified nonionic polysaccharide is in the range of 0.1 to 2.

The nonionic polysaccharide may be especially chosen from glucans, modified or non-modified starches (such as those derived, for example, from cereals, for instance wheat, corn or rice, from vegetables, for instance yellow pea, and tubers, for instance potato or cassava), amylose, amylopectin, glycogen, dextrans, celluloses and derivatives thereof (methylcelluloses, hydroxyalkylcelluloses, ethylhydroxyethylcelluloses), mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gum arabics, gum tragacanths, ghatti gums, karaya gums, carob gums, galactomannans such as guars and nonionic derivatives thereof (hydroxypropyl guar), and mixtures thereof.

Among the celluloses that are especially used are hydroxyethylcelluloses and hydroxypropylcelluloses. Mention may be made of the products sold under the names Klucel® EF, Klucel® H, Klucel® LHF, Klucel® MF and Klucel® G by the company Aqualon, and Cellosize® Polymer PCG-10 by the company Amerchol.

In one embodiment, the nonionic polysaccharide is a nonionic guar. The nonionic guar can be modified or non-modified. The non-modified nonionic guars include the products sold under the name Vidogum® GH 175 by the company Unipectine and under the names Meypro®-Guar 50 and Jaguar® C by the company Solvay. The modified nonionic guars are especially modified with $C_1$-$C_6$ hydroxyalkyl groups. Among the hydroxyalkyl groups that may be mentioned, for example, are hydroxymethyl, hydroxyethyl, hydroxypropyl and hydroxybutyl groups. These guars are well known in the prior art and can be prepared, for example, by reacting the corresponding alkene oxides such as, for example, propylene oxides, with the guar so as to obtain a guar modified with hydroxypropyl groups.

The nonionic polysaccharide, such as the nonionic guar, may have an average Molecular Weight (Mw) of between 100,000 Daltons and 3,500,000 Daltons, preferably between 500,000 Daltons and 3,500,000 Daltons.

The composition may comprise from 0.05 to 10 wt % of the nonionic polysaccharide based on the total weight of the composition, preferably from 0.05 to 5 wt % more preferably from 0.2 to 2 wt %.

Silicones

The composition may further comprise a silicone compound. The silicone compound of the invention can be a linear or branched structured silicone polymer. The silicone of the present invention can be a single polymer or a mixture of polymers. Suitable silicone compounds include polyalkyl silicone, aminosilicone, siloxane, polydimethyl siloxane, ethoxylated organosilicone, propoxylated organosilicone, ethoxylated/propoxylated organosilicone and mixture thereof. Suitable silicones include but are not limited to those available from Wacker Chemical, such as Wacker® FC 201 and Wacker® FC 205. Preferably the silicone compound is an aminoslilicone.

Should the disclosure of any patents, patent applications, and publications which are incorporated herein by reference conflict with the description of the present application to the extent that it may render a term unclear, the present description shall take precedence.

EXAMPLES

Materials

Cationic Polygalactomannan 1: Hydroxypropyl Guar Hydroxypropyl trimonium chloride having a Brookfield RVT viscosity at 25° C. and 20 rpm comprised between 750 and 850 mPa·s, at a concentration of 1 wt % in water, available from Solvay under the name Polycare® Split Therapy. An aqueous solution of the guar (0.5 wt %) was prepared and then used for preparation of the working dilutions.

IWS-Wool SM-12 fabrics were obtained from Testfabrics Company.

Test fabric: EMPA article 252, printed Jersey with pigments (black, blue, red and green colors), in its original form/unpilled, 94% cotton and 6% elastane/spandex, purchased from Swissatest Testmaterialien AG (formerly EMPA Testmaterialien AG).

Example 1

Procedures

The fabrics were rubbed with hand to induce damage. The damage was then recorded with optical microscopy with 4 to 40× magnification.

The damaged fabrics were soaked in aqueous solutions (DI water) which contains Cationic Polygalactomannan 1 at a concentration of 0 ppm, 20 ppm, 40 ppm, and 80 ppm, respectively. The soaking was for 30 min with stirring at room temperature. The fabrics were then dried in an oven at 45° C. overnight.

The treated fabrics were observed under optical microscope to evaluate the level of damage.

As evidenced by microscopy, reduction in fabric degradation is perceivable.

Fabric fibers that have been treated with Cationic Polygalactomannan 1 look smoother and less fibrils were found, compared to untreated fabric fibers (0 ppm group).

As depicted in FIG. 1, fabrics treated with the DI water exhibited fibrils on fiber surface under the microscopy, indicating damage to the fabrics.

Figure 2A:
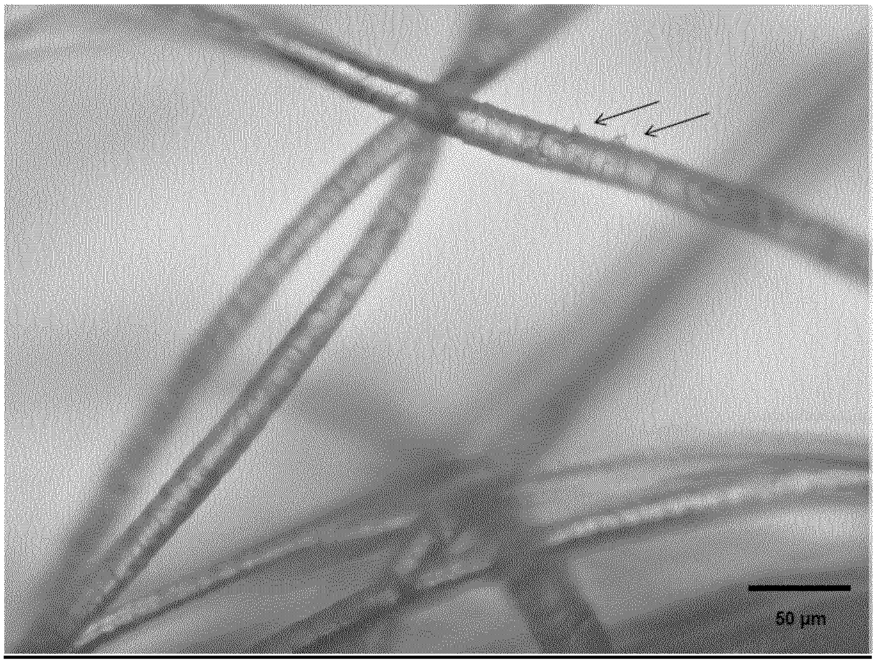

As depicted in FIG. 2*a*, fabrics treated with 20 ppm Cationic Polygalactomannan 1 exhibited less fibrils under the microscopy, indicated reduced damage to the fabrics, which could be attributed to the treatment by Cationic Polygalactomannan 1.

Figure 2B:
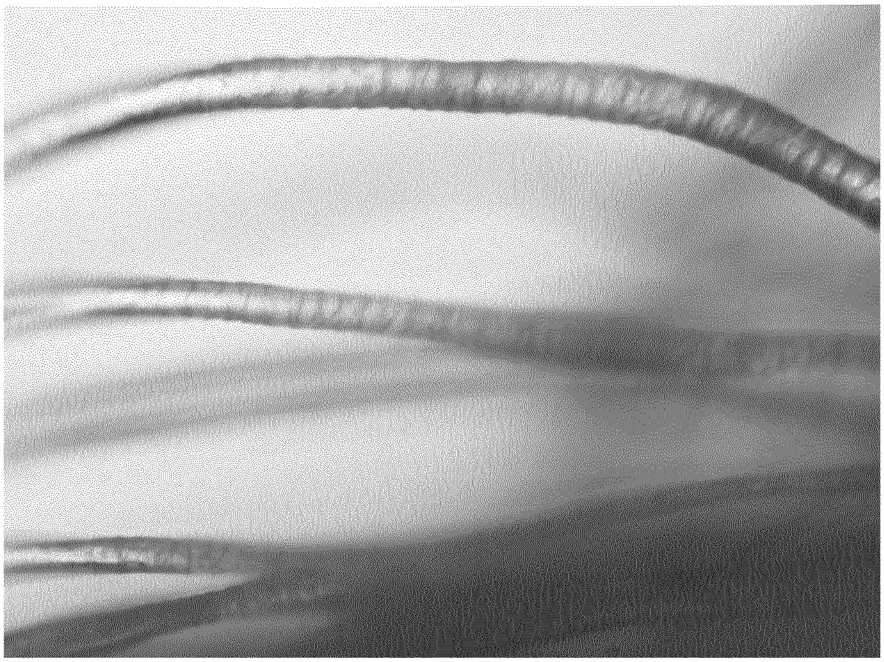
Figure 3A:
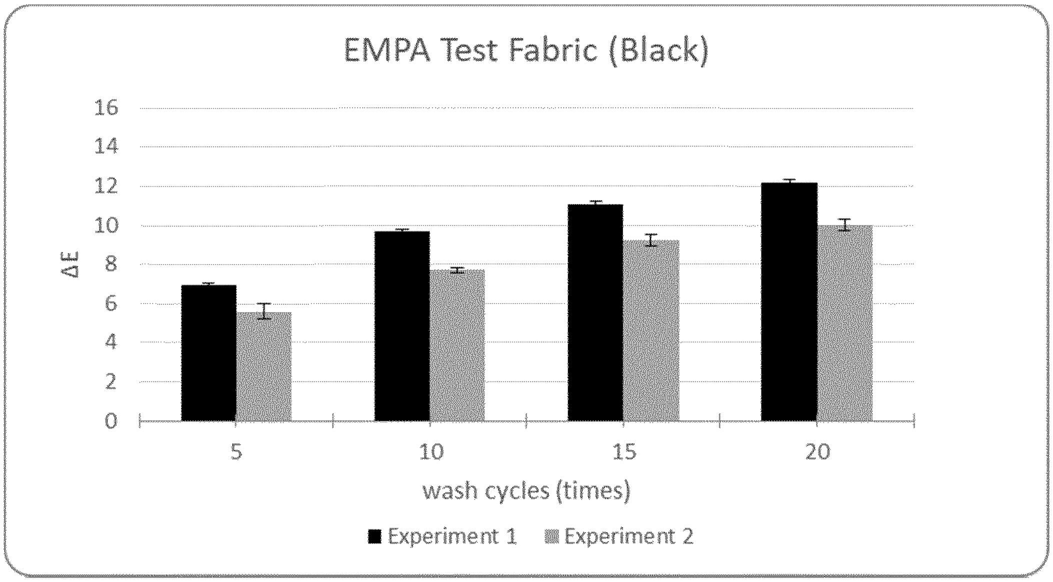
Figure 3B:
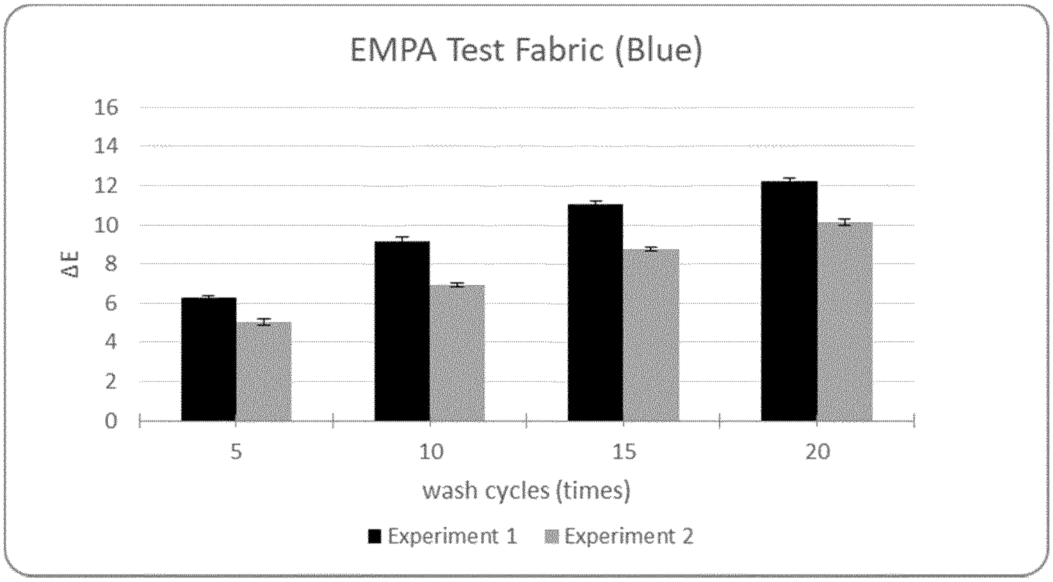
Figure 3C:
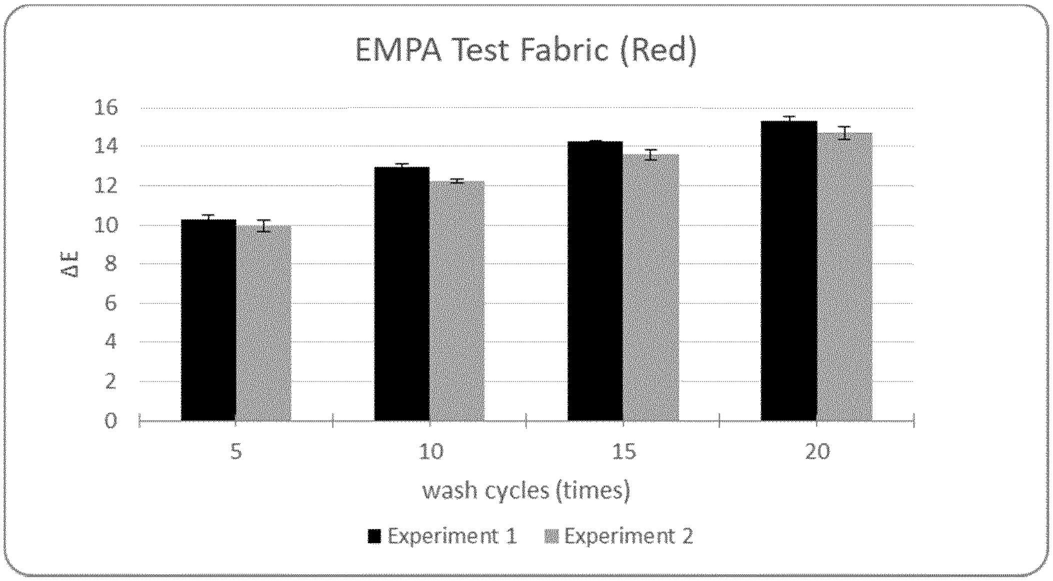
Figure 3D:
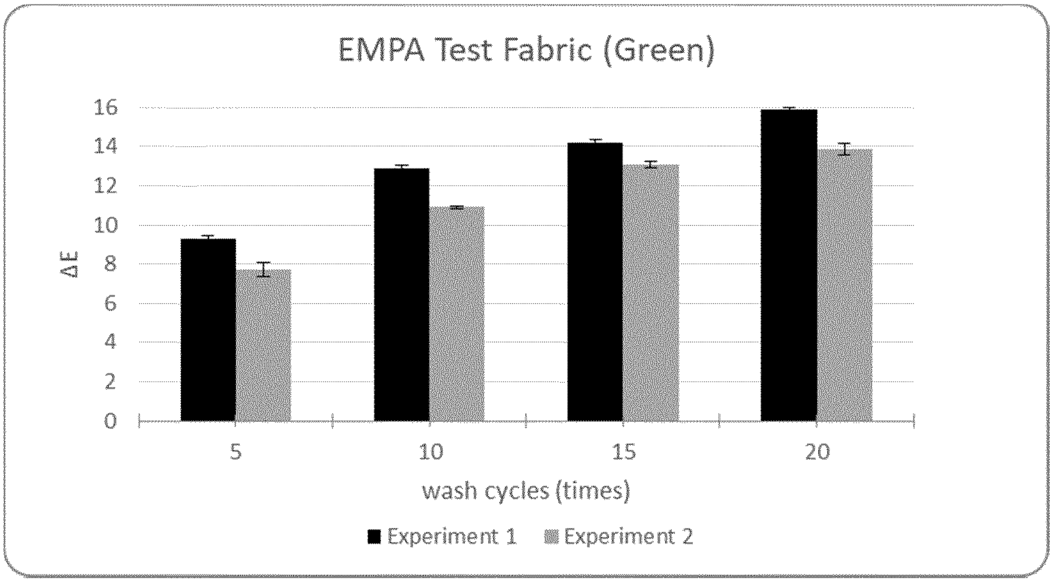

As depicted in FIG. 2*b*, fabrics treated with 40 ppm Cationic Polygalactomannan 1 exhibited no fibrils observed under the microscopy.

These examples illustrate that the specific cationic polygalactomannan containing non-ionic hydroxyalkyl substituents according to the invention, namely cationic polygalactomannan containing non-ionic hydroxyalkyl substituents having a Brookfield RVT viscosity at 25° C. and 20 rpm comprised between 700 and 1,200 mPa·s (and preferably lower than 950 mPa·s especially lower than 850 mPa·s), at a concentration of 1 pbw in water, is highly effective in preventing or recovering degradation of fabrics.

Example 2

Wash Protocols

The test fabrics (in black, blue, red and green colors) were placed in Samsung front load washing machine (model: WW90H5200EW/SP) with washing program for cotton (washing temperature: 40° C. and washing time: 2 hours 42 min which includes 3 rinses with 1200 RPM spin);

Ballast load is 2.5 kg knitted cotton ballast load;

Liquid detergent was added in an amount of 35 mL per wash;

100 mL Cationic Polygalactomannan 1 (1% solution in water) was added, in other words 1 gram Cationic Polygalactomannan 1 per wash;

the test fabrics were washed for 5, 10, 15, and 20 cycles respectively.

For the above wash protocols, for each test fabric in black, blue, red and green colors, Cationic Polygalactomannan 1 was added, which were donated as Experiment 2. As a blank control, the test fabrics were washed without adding Cationic Polygalactomannan 1, which were donated as Experiment 1. For each test fabric, ΔE was determined with spectrophotometer as below:

The EMPA article 252 test fabric before wash was analyzed with ColorQuest XE spectrophotometer from HunterLab to measure its initial CIEALAB color space ($L^*_o$,$a^*_o$, $b^*_o$);

After washed 5, 10, 15 and 20 cycles respectively, with washing machine, the washed EMPA article 252 test fabric was analyzed again with ColorQuest XE spectrophotometer from HunterLab to measure its CIEALAB color space after 5, 10, 15 and 20 wash cycles respectively, ($L^*_x$,$a^*_x$,$b^*_x$);

The color difference after 5, 10, 15 and 20 wash cycles respectively, ($\Delta E_x$) is calculated by using following equation:

$$\Delta E_x = \sqrt{\Delta L_x^2 + \Delta a_x^2 + \Delta b_x^2}$$

$$\Delta L_x - L_x^* - L_o^*$$

$$\Delta a_x = a_x^* a_o^*$$

$$\Delta b_x = b_x^* b_o^*$$

Where x is 5, 10, 15 or 20

The lower the $\Delta E_x$ the better color protection performance.

FIG. 3 (3*a* to 3*d*) shows that the ΔE in Cationic Polygalactomannan 1 treated fabrics is lower than those untreated, which indicates that better color protection on the test fabric with guar.

The invention claimed is:

1. A method for treating a fabric, the method comprising the steps of contacting the fabric with a cationic polygalactomannan and preventing or recovering degradation of the fabric, wherein said cationic polygalactomannan contains non-ionic hydroxyalkyl substituents and has a Brookfield RVT viscosity at 25° C. and 20 rpm between 700 and 1,200 mPa·s, at a concentration of 1 wt % in water, wherein the cationic polygalactomannan is a hydroxypropyl guar hydroxypropyltrimonium chloride, and wherein preventing or recovering degradation of the fabric is evidenced by less fibrils in the fabric as compared to contacting the fabric with deionized (DI) water alone.

2. The method according to claim 1, wherein the cationic polygalactomannan has a Brookfield RVT viscosity at 25° C. and 20 rpm comprised between 700 and 950 mPa·s, at a concentration of 1 wt % in water.

3. The method according to claim 1, wherein the cationic polygalactomannan has a Brookfield RVT viscosity at 25° C. and 20 rpm comprised between 750 and 950 mPa·s, at a concentration of 1 wt % in water.

4. The method according to claim 1, wherein the cationic polygalactomannan has a Brookfield RVT viscosity at 25° C. and 20 rpm comprised between 750 and 900 mPa·s, at a concentration of 1 wt % in water.

5. The method according to claim 1, wherein the cationic polygalactomannan has a Brookfield RVT viscosity at 25° C. and 20 rpm comprised between 750 and 850 mPa·s, at a concentration of 1 wt % in water.

6. The method according to claim 1, wherein the method comprises a step of contacting a fabric having degradation with said cationic polygalactomannan.

* * * * *